US011275643B2

(12) United States Patent
McCann et al.

(10) Patent No.: US 11,275,643 B2
(45) Date of Patent: Mar. 15, 2022

(54) DYNAMIC CONFIGURATION OF ANOMALY DETECTION

(71) Applicant: Microsoft Technology Licensing, LLC, Redmond, WA (US)

(72) Inventors: Robert Lee McCann, Snoqualmie, WA (US); Christian Seifert, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 169 days.

(21) Appl. No.: 16/597,199

(22) Filed: Oct. 9, 2019

(65) Prior Publication Data

US 2021/0110282 A1  Apr. 15, 2021

(51) Int. Cl.
G06F 11/07 (2006.01)

(52) U.S. Cl.
CPC ...... *G06F 11/0793* (2013.01); *G06F 11/0706* (2013.01); *G06F 11/079* (2013.01)

(58) Field of Classification Search
CPC combination set(s) only.
See application file for complete search history.

(56) References Cited

U.S. PATENT DOCUMENTS

| 9,930,057 B2 | 3/2018 | Di Pietro et al. |
| 10,218,731 B2 | 2/2019 | Ganame et al. |
| 10,291,635 B2 | 5/2019 | Muddu et al. |
| 2017/0124502 A1* | 5/2017 | Brew ............... H04L 67/42 |
| 2017/0279848 A1 | 9/2017 | Vasseur et al. |
| 2018/0007074 A1 | 1/2018 | Kune et al. |
| 2018/0013776 A1 | 1/2018 | Gay et al. |
| 2019/0081969 A1 | 3/2019 | Phadke et al. |
| 2019/0124045 A1 | 4/2019 | Zong et al. |
| 2019/0149565 A1 | 5/2019 | Hagi et al. |
| 2019/0188212 A1 | 6/2019 | Miller et al. |
| 2019/0235944 A1 | 8/2019 | Velipasaoglu et al. |

(Continued)

OTHER PUBLICATIONS

Goldstein, M et al.; "A Comparative Evaluation of Unsupervised Anomaly Detection Algorithms for Multivariate Data;" PLoS ONE, vol. 11, #4; Apr. 19, 2016, 31 pages.*

(Continued)

*Primary Examiner* — Joseph R Kudirka
(74) *Attorney, Agent, or Firm* — Schwegman Lundberg & Woessner, P.A.

(57) ABSTRACT

The disclosed embodiments generate a plurality of anomaly detector configurations and compare results generated by these anomaly detectors to a reference result set. The reference result set is generated by a trained model. A correlation between each result generated by the anomaly detectors and the result set is compared to select an anomaly detector configuration that provides results most similar to those of the trained model. In some embodiments, data defining the selected configuration is then communicated to a product installation. The product installation instantiates the defined anomaly detector and analyzes local events using the instantiated detector. In some other embodiments, the defined anomaly detector is instantiated by the same system that selects the anomaly detector, and thus in these embodiments, the anomaly detector configuration is not transmitted from one system to another.

20 Claims, 12 Drawing Sheets

(56) References Cited

U.S. PATENT DOCUMENTS

2019/0392351 A1* 12/2019 Zuluaga .................. G06F 17/18

OTHER PUBLICATIONS

Xu K, Xia M, Mu X, Wang Y, Cao N; "EnsembleLens: Ensemble-based Visual Exploration of Anomaly Detection Algorithms with Multidimensional Data;" IEEE Transactions on Visualization and Computer Graphics; vol. 25, # 1; Aug. 20, 2018; pp. 109-119.*

"International Search Report and Written Opinion issued in PCT Application No. PCT/US2020/054332", dated Dec. 18, 2020, 32 Pages.

Renaudi, et al., "Benchmarking Anomaly Detection Algorithms in an Industrial Context: Dealing with Scarce Labels and Multiple Positive Types", In Proceedings of IEEE International Conference on Big Data (Big Data), Dec. 10, 2018, pp. 1228-1237.

Buehrer, Greg, et al., "Classification of Automated Web Traffic", In Weaving Services and People on the World Wide Web, Jan. 1, 2009, 27 Pages.

Blesson, John, "Release Models at Pace using Microsoft's Automated Machine Learning!", Retrieved From: https://azure.microsoft.com/en-us/blog/release-models-at-pace-using-microsoft-s-automl/, Sep. 24, 2018, 6 Pages.

Siddiqui, MD A., et al., "Detecting Cyber Attacks Using Anomaly Detection with Explanations and Expert Feedback", In Proceedings of the IEEE International Conference on Acoustics, Speech and Signal Processing, May 12, 2019, pp. 2872-2876.

Stokes, Jack W., et al., "ALADIN: Active Learning of Anomalies to Detect Intrusion", In Technical Report MSR-TR-2008-24, Mar. 4, 2008, 24 Pages.

* cited by examiner

DYNAMIC CONFIGURATION OF ANOMALY DETECTION

BACKGROUND

Anomaly detection techniques have many advantages. In particular, anomaly detection may identify new or unique events from unlabeled data. In contrast, supervised classification in machine learning excels at detecting a re-occurrence of a known event, but relies on labeled examples of those events to learn models. For example, in the security domain, anomaly detection can identify strange program behavior and expose never-seen-before malware types, while supervised classifiers are more suitable for detection of already-known malware types.

Despite its advantages, anomaly detection can be hard to use in practice. First, while there is a wide variety of anomaly detection algorithms, they may be tuned by hyperparameters to tailor a definition of "novel" employed by a particular detector. It can be challenging to anticipate which specific configuration of an anomaly detector will yield useful results. Second, and more fundamentally, "novel" is different from "useful". Returning to the security example, there are many legitimate programs that exhibit rare but non-malicious behavior. Both of these issues lead to a formidable obstacle, that of identifying a combination of anomaly detection algorithms and parameters that detect "novel" events that provide useful observations for the task at hand. Therefore, improved methods of anomaly detection are needed.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
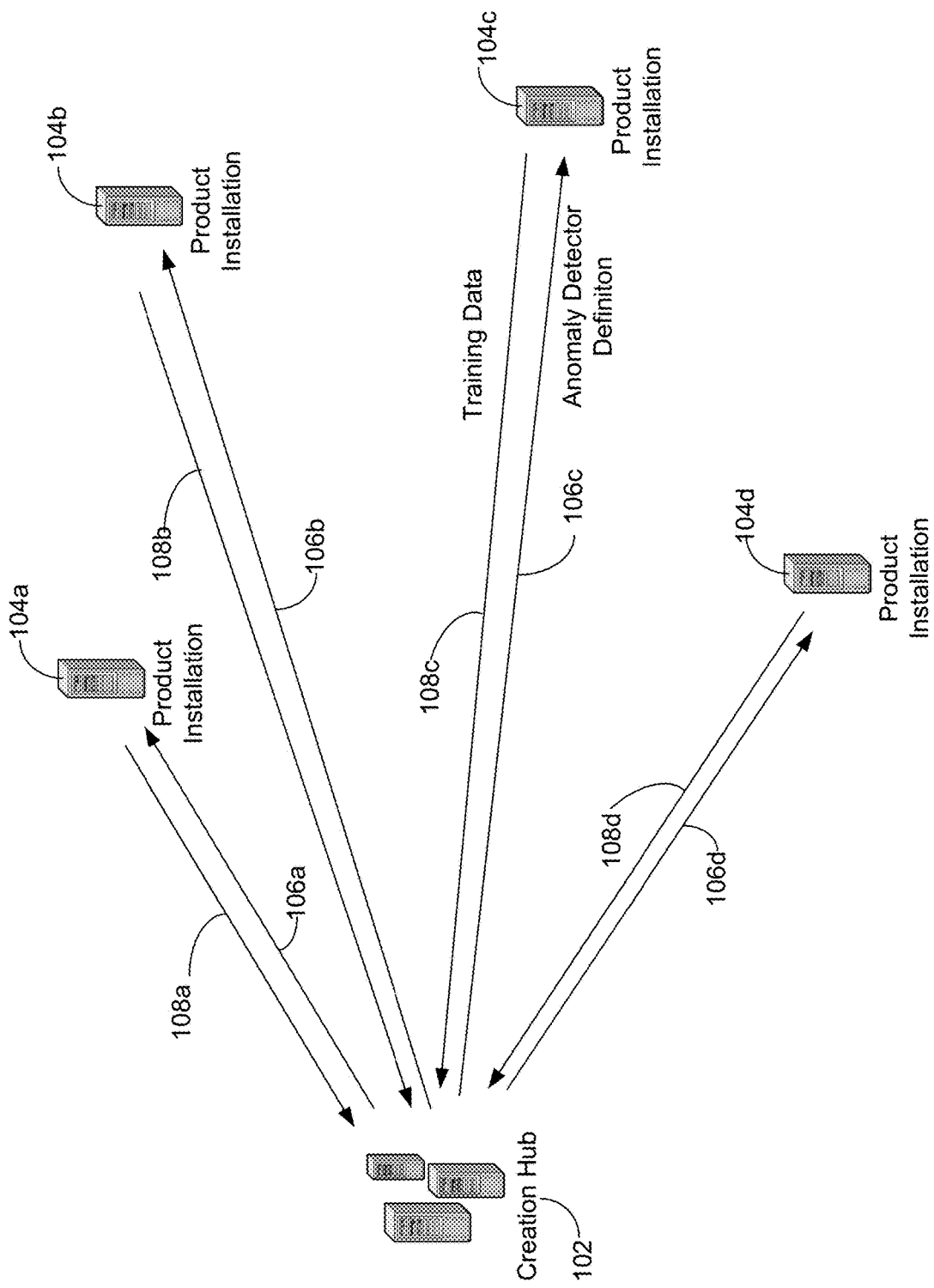
FIG. 1 is an overview diagram of an anomaly detector definition system that is implemented in at least one of the disclosed embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The disclosed embodiments describe an environment that provides continuous improvement in anomaly detector performance. As discussed further below, an anomaly detector creation hub generates multiple anomaly detector configurations and instantiates these anomaly detectors. A test data set is analyzed by each of the anomaly detectors with each anomaly detector ranking and/or classifying the events. In some embodiments, the events are ranked to indicate a relative level of abnormality or relevance of each event. Thus, in some embodiments, an event ranked first is a most abnormal event relative to other events included in the test data. The events are also ranked via a trained classifier. The classifier is trained using annotated trained data that may have been annotated via human input, and/or a combination of human and machine input.

In some embodiments, the ranking of events also communicates a probability that an event being ranked is each of a plurality of event types. In some embodiments, the ranking includes a plurality of probabilities for each event. Each of the plurality of probabilities communicates a probability that an event is one of the plurality of event types.

The ranking and/or classifications generated by the trained classifier is considered a reference ranking or classification. The reference ranking is then compared to the rankings/classifications generated by each of the instantiated detectors. The comparisons may include generating an indication of correlation between the reference ranking/classifications and the rankings/classifications generated by the instantiated anomaly detectors. An anomaly detector having the highest correlation to the reference ranking/classifications may be selected for distribution to one or more product installations.

After an anomaly detector configuration is selected, data defining the configuration is distributed to a product installation. For example, in some aspects, an anomaly detector creation hub is maintained by a software vendor. After the software vendor selects an anomaly detector configuration, the software vendor distributes data defining the configuration to product installations at customer sites. Each of the product installation is then able to instantiate the selected detector within a local environment at the customer site. The instantiated detector then operates on data generated locally within the customer environment.

In some of the disclosed embodiments, the product installations also function to provide training data back to the anomaly detector creation hub. This additional training data is used to evaluate additional variations in anomaly detector configurations. In some embodiments, the additional training data is annotated to further train the trained model discussed above and thus generate a second reference ranking or classification. The additional variations in anomaly detector configurations are then evaluated against this second reference ranking or classifications. As above, a configuration resulting in the most correlation with the improved second reference ranking or classification is selected and data defining same is again distributed to product installations. This cycle may repeat during the life of a particular product and/or anomaly detector application.

FIG. 1 is an overview diagram of an anomaly detector definition system 100 that is implemented in at least one of the disclosed embodiments. The system 100 includes an anomaly detector creation hub 102. The anomaly detector creation hub 102 is in communication with four product installations 104a-d. The product installations 104a-d represent installation or deployment sites for a product. A product installation utilizes an anomaly detector to detect anomalous behavior occurring within a local environment of the respective product installation (e.g. any of 104a-d).

The creation hub 102 is shown distributing anomaly detector definition data 106a-d to each of the product installations 104a-d respectively. The anomaly detector definition data 106a-d may define an anomaly detection algorithm and one or more hyperparameter values for the algorithm. The product installations 104a-d deploy the defined anomaly detector to their respective products. The product installations 104a-d also collect event data that defines one or more computer system events. In various embodiments, the computer system events identify process creation events, packets transmitted on a network, file operations such as file creation, deletion, modification, registry edits, login/logout events, or other types of events. Each of these events also identify one or more parameters associated with the event. For example, a process creation event identifies, in some embodiments, a file name associated with executable code instantiated when the process is created. Input parameters to a "createprocess( )" function are also defined as part of the event, at least in some embodiments.

The product installations 104a-d then transmit at least a portion of the respective event data, shown in FIG. 1 as training data 108a-d to the anomaly detector creation hub 102. The anomaly detector creation hub 102 may utilize the training data 108a-d to improve the anomaly detector. This may result in additional or updated anomaly detector definition data 106a-d being re-distributed to each of the product installations 104a-d. Note that while FIG. 1 as described above demonstrates a separation between the creation hub 102 and product installations 104a-d. Some other embodiments do not necessarily implement this separation. For example, a single system or hardware processor is configured, in some embodiments, to both select an anomaly detector from a variety of anomaly detector configurations, and then detect anomalous behavior (or rank computer events) based on the selected anomaly detector, as described further below. In these embodiments, no configuration information defining a selected anomaly detector is transmitted from one computer system (or hardware processor) to another.

Figure 2A:
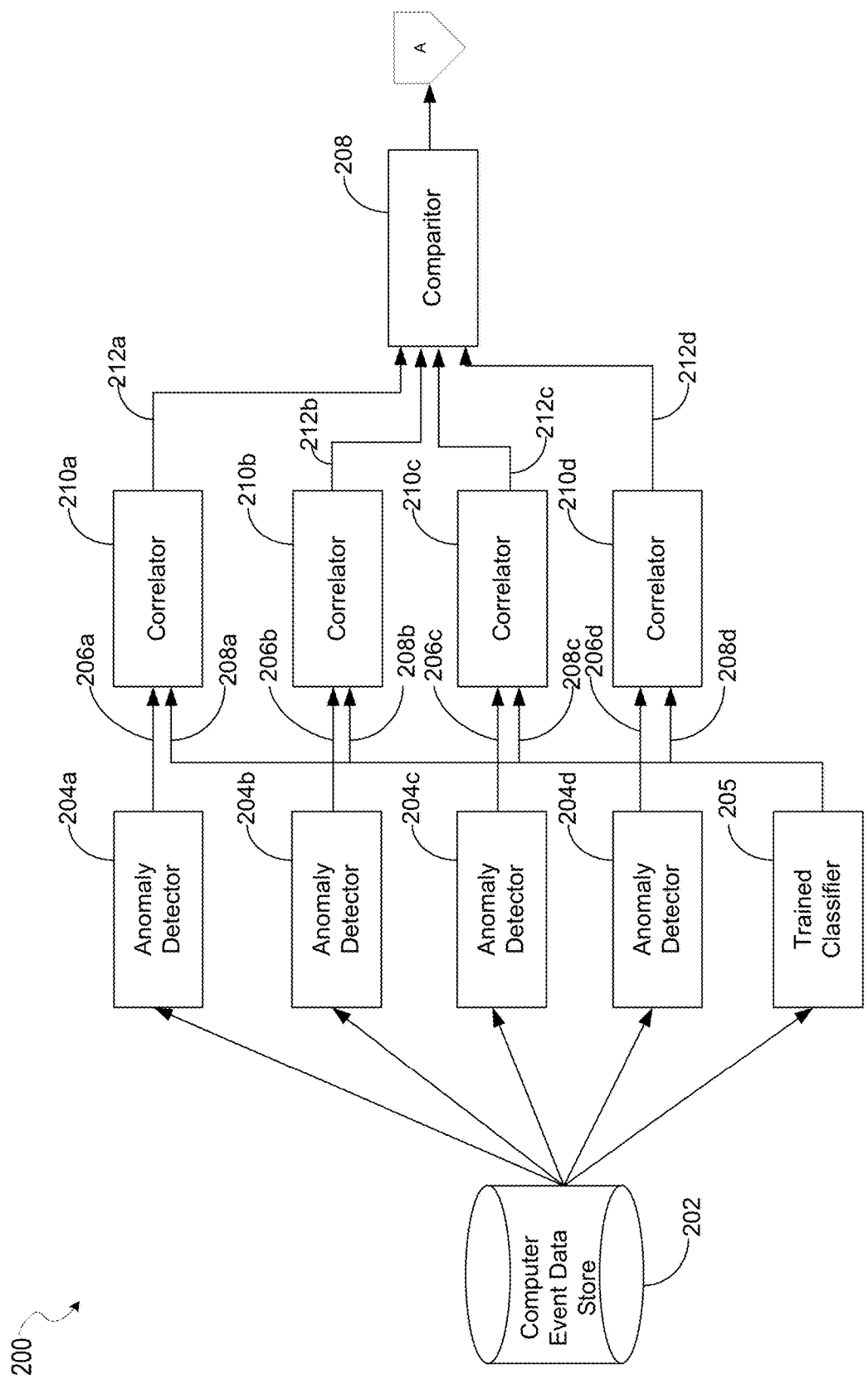
FIGS. 2A-2C are data flow diagrams illustrating data flow in one or more of the disclosed embodiments.
Figure 2B:
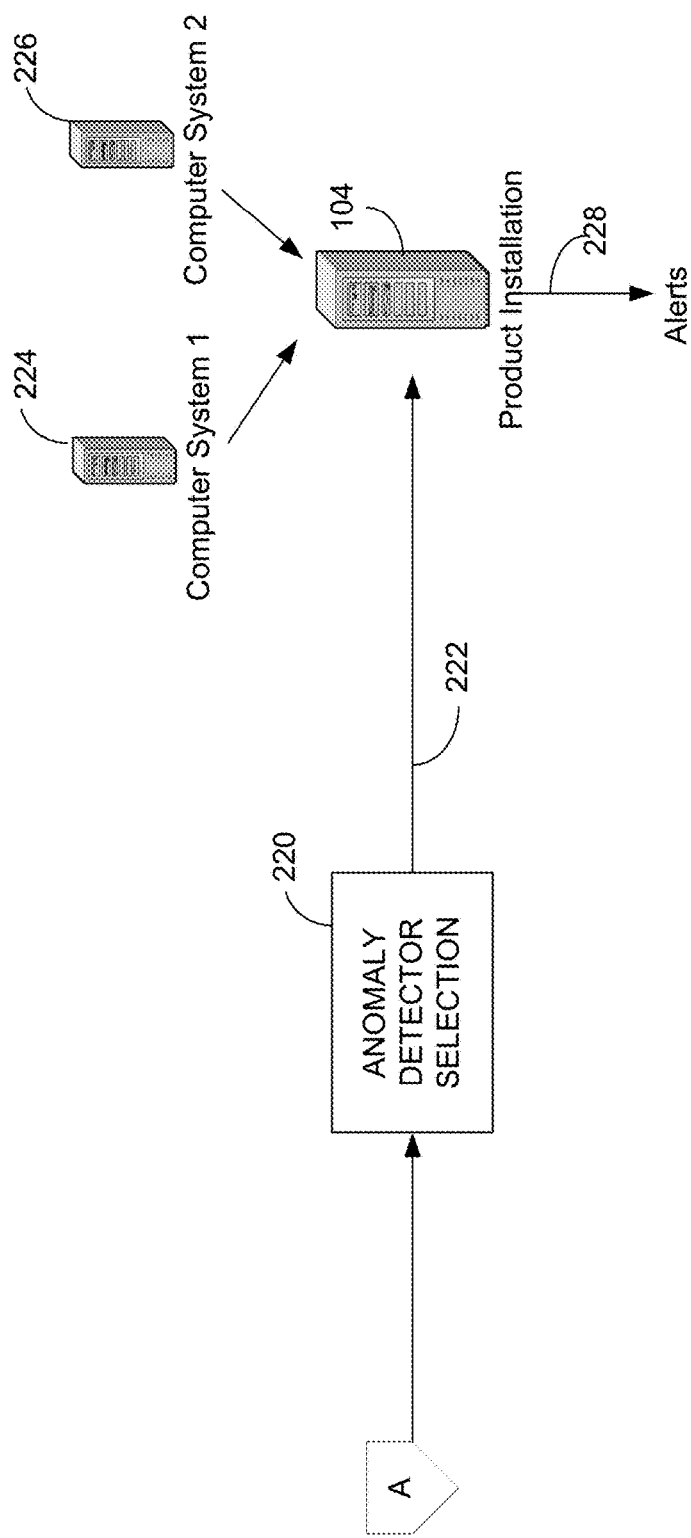

FIGS. 2A-B show a data flow diagram illustrating data flow in one or more of the disclosed embodiments. FIG. 2A shows a plurality of anomaly detectors 204a-d. The anomaly detectors 204a-d represent a configuration of an anomaly detector. The configuration includes one or more of a specification for an algorithm used by the anomaly detector, one or more hyperparameter values for the algorithm, or a specification for a feature selection and/or transformation scheme used by the anomaly detector.

Each of the anomaly detectors 204a-d is readying data from a computer event data store 202 and processing the data to identify anomalous events within the data. FIG. 2A also shows a trained classifier 205. The trained classifier 205 is also reading data from the computer event data store 202, and ranking the events based on how relevant each event is within the data. Indications of anomalous data generated by each of the anomaly detectors 204a-d is shown in FIG. 2A as 206a-d respectively. Indications of anomalous data generated by the trained classifier is shown in FIG. 2 as 208a-d.

FIG. 2A also shows correlators 210a-d. Each of the correlators receives as input, the output from the trained classier 205. This is shown via data flows 208a-d respectively. Each of the correlators 210a-d also receives as input, an output from one of the anomaly detectors 204a-d respectively. Each of the correlators then compares its two respective inputs and outputs a signal, shown as 212a-d to a comparator 208.

The data flow 200 continues via off page reference "A" to FIG. 2B, which shows the comparator 208 providing data to an anomaly detector selection component 220. The anomaly detector selection component 220 selects one or more of the anomaly detectors 204a-d based on the correlation scores provided by the correlators 210a-d. The anomaly detector selection component 220 then provides data 222 defining the selected anomaly detector to a product installation 104.

The product installation then utilizes the defined anomaly detector to detect anomalous events in a local environment. For example, the two computer systems 224 and 226 represent a local environment of the product installation 104. The product installation 104 monitors activity of the two computer systems 224 and 226. For example, the product installation 104 monitors system log files, event logs, or similar activity information generated by the two computer systems 224 and 226 and detects anomalous behavior of one or more of the computer systems 224 and 226 via the selected anomaly detector. The product installation then generates events 228 indicating the anomalous behavior.

Figure 2C:
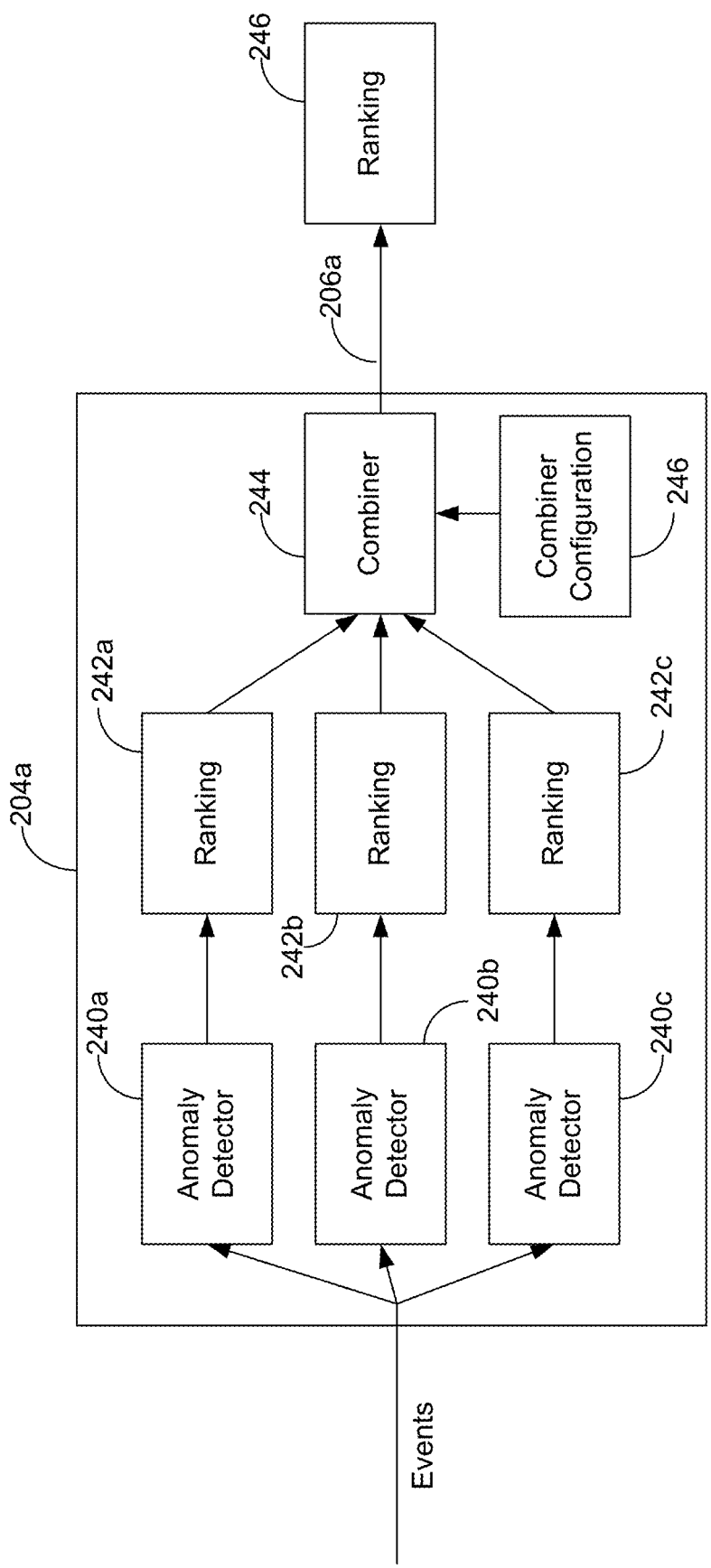

FIG. 2C shows an example implementation of an anomaly detector that is implemented in one or more of the disclosed embodiments. The example anomaly detector 204a illustrated in FIG. 2C could be any one or more of the anomaly detectors 204a-d illustrated in FIG. 2A. The example anomaly detector 204a shown in FIG. 2C is considered an ensemble anomaly detector, in that it includes multiple separate anomaly detection algorithms. Shown are anomaly detectors 240a-c. Each of the anomaly detectors 240a-c relies on separate learned feature data and/or model information to perform anomaly detection or ranking of computer events from the event data store 202 shown in FIG. 2A. Each of the anomaly detectors 240a-c is separately trained via a training process as described below with respect to FIG. 4. Each of the anomaly detectors 240a-c included in the ensembled anomaly detector 204a generates a respective ranking of computer events, shown as rankings 240a-c. A combiner component 244 of the ensemble anomaly detector 204a combines the multiple rankings produced by the multiple anomaly detectors of ensemble anomaly detector 204a to generate a single ranking 246 as output of the ensemble anomaly detector 204a. The combiner component 244 is controlled via combiner configuration data 245. For example, the combiner configuration data 245 specifies, in various embodiments, one or more of weights associated with each of the rankings 242a-c when combining the rankings 242a-c, an algorithm used for the combination (e.g. averaging of the rankings, weighted average of the rankings, or other algorithms).

Figure 3:
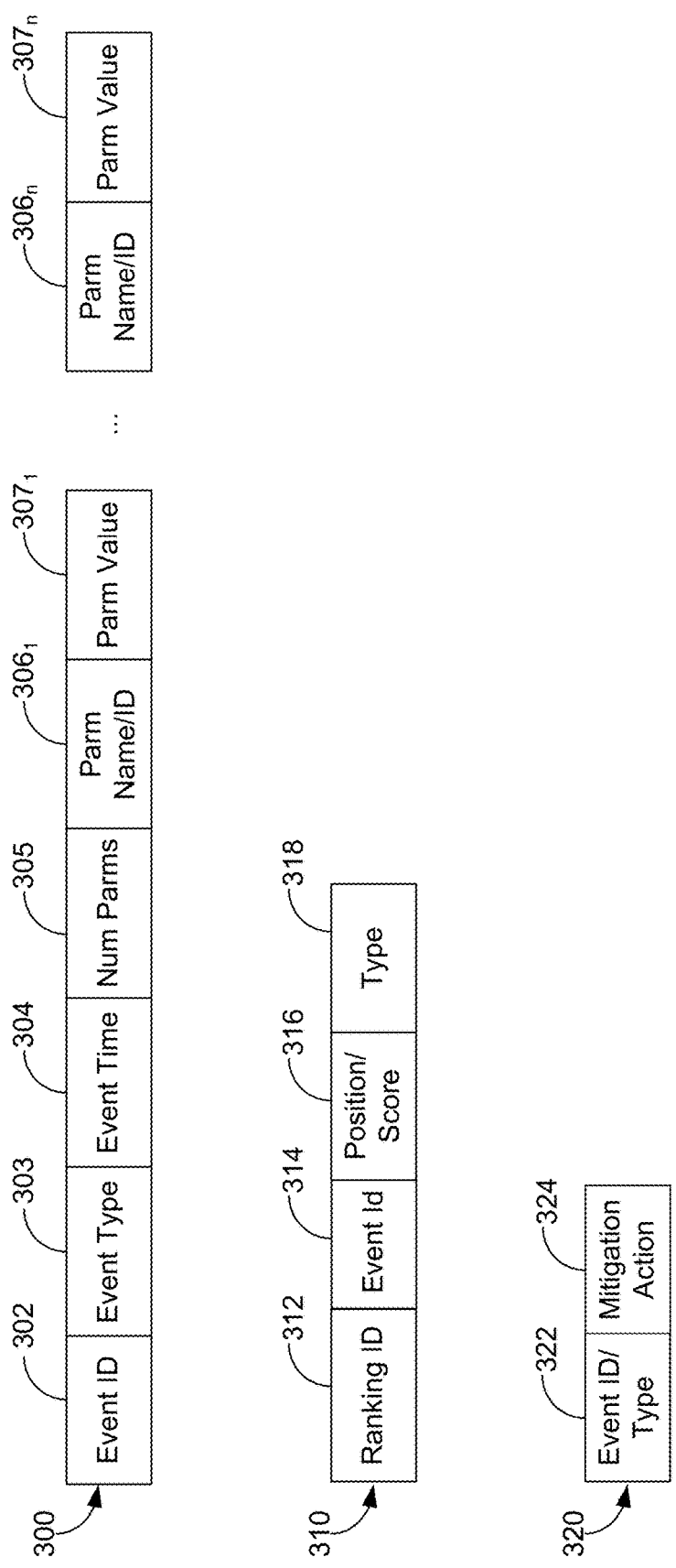
FIG. 3 shows example data structures that are implemented in one or more of the disclosed embodiments.

FIG. 3 shows example data structures that are implemented in one or more of the disclosed embodiments. FIG. 3 shows an event table 300 a ranking table 310, and a mitigation table 320. In some embodiments, the event table 300 is included in the computer event data store 202, discussed above with respect to FIG. 2A. The event table stores information relating to events ranked by embodiments of the present disclosure. The event table 300 includes an event identifier 302, event type 303, event time field 304, and a number of parameters field 305. The event table also includes a variable number of pairs of fields. Each pair includes a parameter name/identifier field 306, and a parameter value field 307. The number of pairs is defined by the number of parameters field 305. The event identifier field 302 uniquely identifies an event to be ranked by the disclosed embodiments. The event type 303 identifies a type of the event. For example, the event type field 303 distinguishes between process creation events, network packet transmission or reception event, file operation event, or other types of events. The event time field 304 identifies a time that the event occurred. The parameter id/name field 306 identifies a particular parameter of an event. For example, for a process creation event, the parameter id/name field 306 may identify a process name or file name used to create the process. The parameter value field 307 identifies a value of the identified parameter.

The ranking table 310 includes a ranking identifier field 312, an event identifier field 314, and a position indication field 316. The ranking identifier field 312 uniquely identifies a particular ranking. For example, in some embodiments, each of the anomaly detectors 204a-d and the trained classifier 205 generate separate rankings of events. Thus, each of these separate rankings are assigned different ranking identifiers in at least some embodiments. The event identifier field 314 is cross referenceable with the event identifier field 302, and identifies a particular event within a particular ranking. The position/score field 316 identifies, in some embodiments, a position within the ranking (e.g. identified via field 312) of the identified event (e.g. identified via field 314). Some embodiments operate on scores or probabilities instead of rankings. For example, while a ranking indicates a relevance of a particular event relative to other events, some embodiments may instead determine a probability that a particular event is classified as a particular type of event. Thus, in these embodiments, the field 316 does not store a ranking indicating a relative measure of relevance, but instead, the field 316 stores an indication of a likelihood that a particular event is of a particular type (e.g. a probability that the event is of a particular type). The event type 318 indicates a type of event. A probability that an event, identified by the event id field 314, is the type of event indicated by the event type field 318, is stored in the position/score field 316 in some embodiments.

The mitigation table 320 includes an event identifier/type field 322 and a mitigation action field 324. The event identifier field 322 uniquely identifies an event, and is cross referenceable with any of the fields 302 and 314. In some embodiments, the field 322 identifies a type of event. Thus, in these embodiments, all events having a common type are mitigated via a common set of one or more mitigation actions defined in field 324 and discussed further below. If the field 322 stores an event type, the field 322 can be cross referenced with the field 318, discussed above.

The mitigation action field 324 defines one or more mitigation actions associated with the event (identified via field 322). In some embodiments, the mitigation action field 324 identifies one or more of executable code to perform a mitigation action, or parameters to pass to the executable code. For example, the mitigation action field 324 may define portions of the event identified via field 322 that are passed as input parameters to the executable code performing the mitigation. Mitigation actions may include, for example, resetting a computer generating the event, generating an email or text message to a defined distribution list, with the email or text describing the event that occurred. Other mitigation actions can include adjusting one or more system parameters. For example, a mitigation action is increasing an amount of swap space available. Another mitigation action is increasing a verbosity level of logging or tracing diagnostic utilities.

Figure 4:
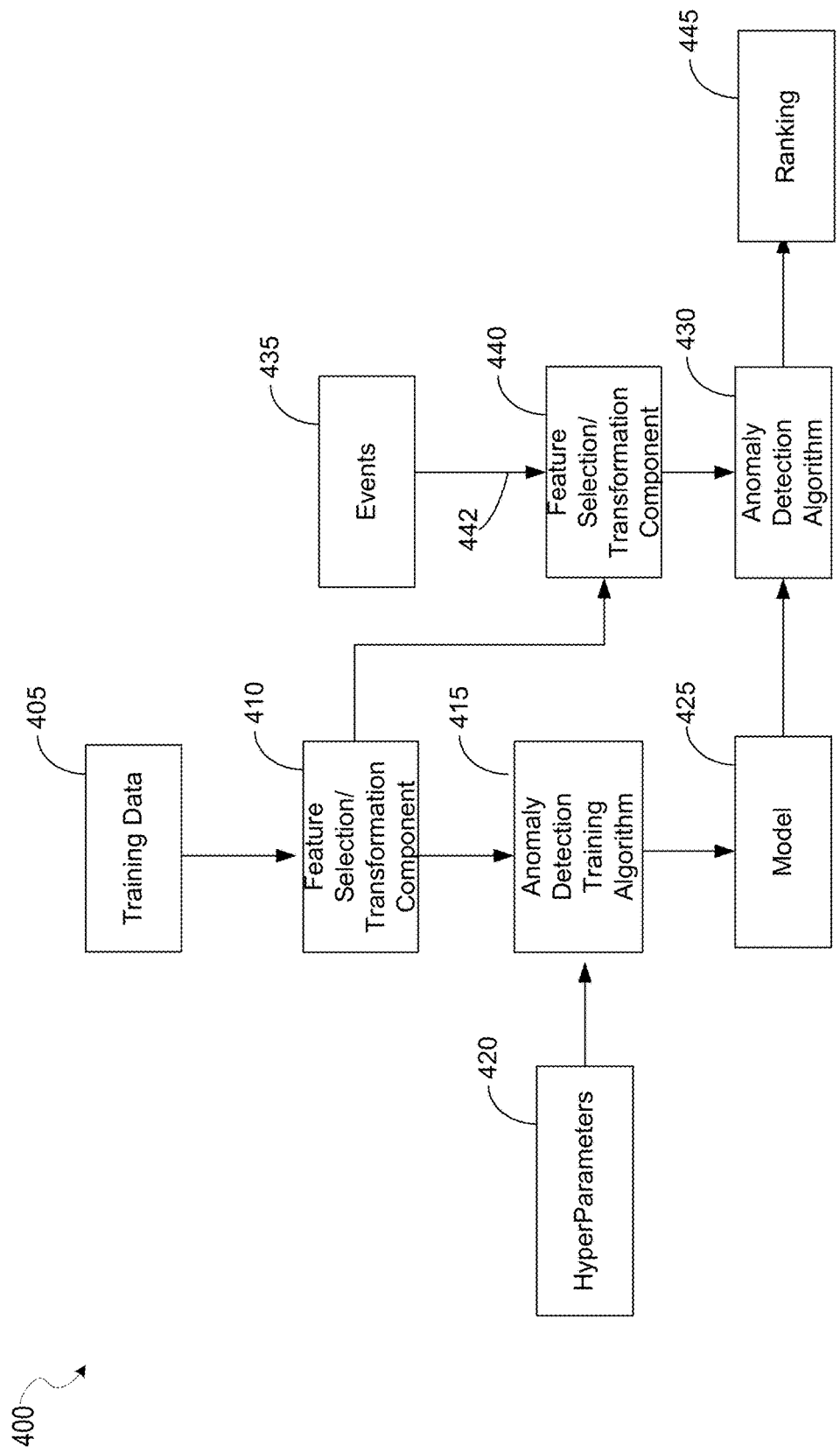
FIG. 4 shows an example data flow present in an anomaly detector in at least one of the disclosed embodiments.

FIG. 4 shows an example data flow present in an anomaly detector in at least one of the disclosed embodiments. In various embodiments, the data flow 400 discussed with respect to FIG. 4 is implemented in any one of the anomaly detectors 204a-d of FIG. 2A. The data flow 400 demonstrates operation of a single anomaly detector, such as any one or more of anomaly detectors 240a-c, and/or any of the anomaly detectors 204a-d that are not an ensembled anomaly detectors. An ensembled anomaly detector, such as the one illustrated above with respect to FIG. 2C, could include multiple copies of components 425, 440, 430, and 445, discussed below, one for each single anomaly detector included in the ensembled anomaly detector. Each of the single anomaly detectors included in an ensembled anomaly detector would be separately trained via independent copies of components 410, 415, 420, resulting in at least separate copies of 425, which are used at run time by each respective single anomaly detector.

The components of an anomaly detector system shown in FIG. 4 represent portions of an anomaly detector configuration in at least one embodiment. FIG. 4 shows training data 405, feature selection/transformation component 410, an anomaly detection training algorithm 415. The feature selection/transformation component 410 processes the training data 405 and provides the processed data to the anomaly detection training algorithm 415. Based on the training data and one or more hyperparameters 420, the anomaly detection training algorithm 415 generates data defining a model 425. Examples of information stored in the model 425 include feature weights in OC-SVM, tree information when using isolation forests, distributional parameters for mixture models, or forgetting factors for timeseries models.

An anomaly detection algorithm 430 then relies on the learned features 425 to analyze additional event data 435. The event data 435 may be stored or conform to the format of the event table 300 discussed above with respect to FIG. 3 in at least some embodiments. In some embodiments, the event data is also processed by a feature selection, transformation component 440. Configuration parameters 442 that define operation of the feature selection/transformation component 410 are passed to the feature selection/transformation component 440 to ensure its operation is analogous to that of feature selection/transformation component 410.

In some embodiments, the anomaly detection algorithm 430 then generates a ranking 445 of the additional event data 435. The additional event data 435 is ranked from a most relevant event to a least anomalous event. In some embodiments, the ranking 445 is represented via the ranking table 310, discussed above with respect to FIG. 3. The anomaly detection algorithm 430 implements one or more of a one class support vector machine (SVM), k-means, or local outlier factor-based anomaly detection.

In some other embodiments, the anomaly detection algorithm 40 classifies an event type of the event. For example, the anomaly detection algorithm 430, in some embodiments, determines a probability that a particular event is a particular event type. Probabilities for a plurality of event types is generated in some embodiments. Thus, based on a particular event, a plurality of probabilities are generated, with each probability indicating a probability that the particular event is a particular type of event.

In some embodiments, data defining an anomaly detector includes the model 435 and a specification of the anomaly detection algorithm 430. For example, in some aspects, the specification of the anomaly detection algorithm 430 includes instructions that implement the algorithm. The instructions may be specified in source code, or intermediate code, or machine code in various embodiments. In some embodiments, the specification identifies a pre-existing algorithm for anomaly detection. For example, a pre-existing algorithm may be identified via a predetermined identifier that is mapped to the pre-existing algorithm.

Figure 5:
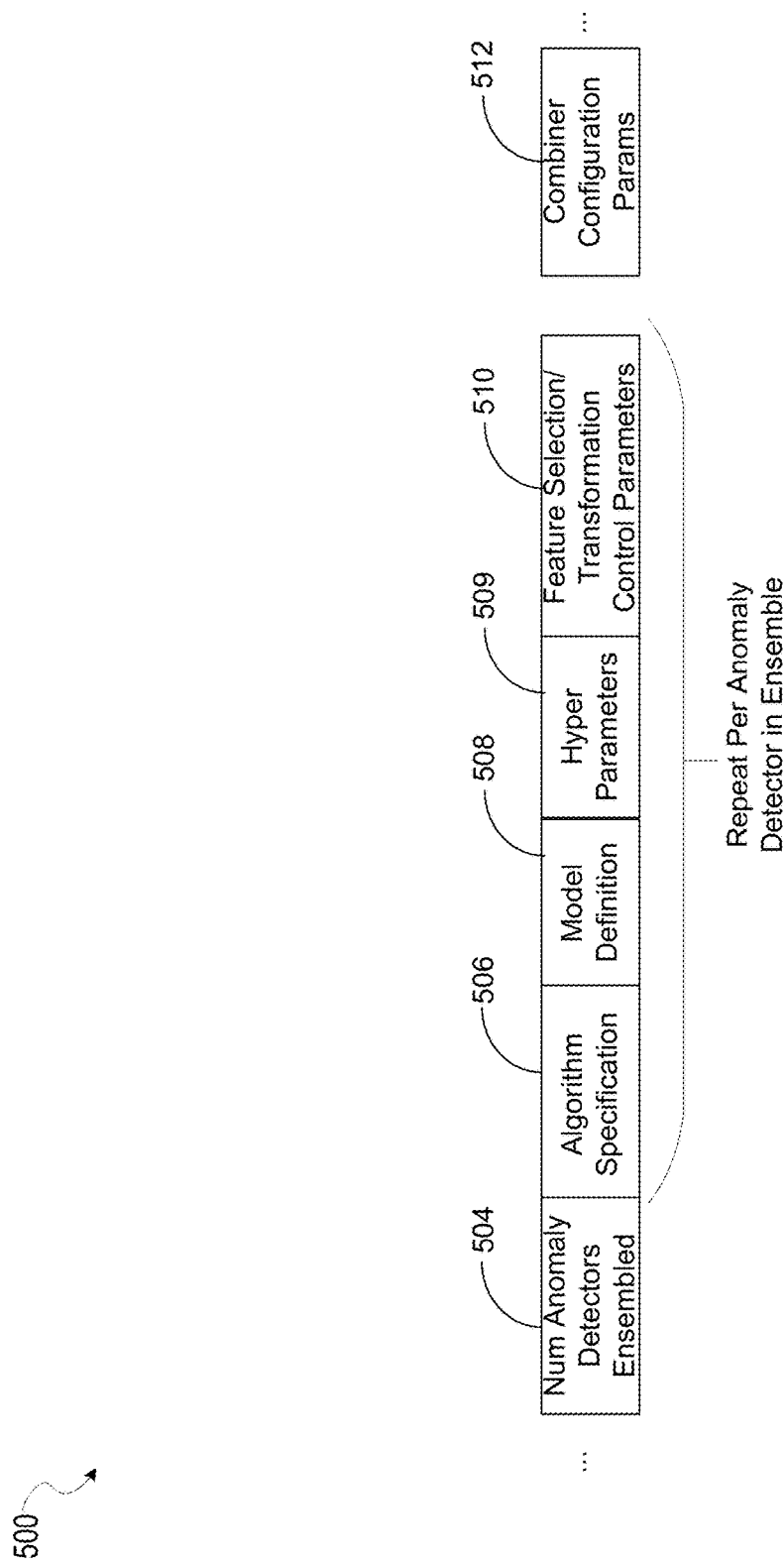
FIG. 5 is an example message portion that is implemented in one or more of the disclosed embodiments.

FIG. 5 is an example message portion that is implemented in one or more of the disclosed embodiments. In some embodiments one or more fields described below with respect to the message portion 500 are transmitted from the creation hub 102 to least one of the product installations 104a-d. For example, the message portion 500 may be included in one or more of data flows 106a-d from the creation hub 102 to the product installations 104a-d respectively. The message portion 500 is transmitted in some embodiments as part of data flow 222, from the anomaly detector selection component 220 to the product installation 104, discussed above with respect to FIG. 2B.

The message portion 500 defines an anomaly detector configuration. In other words, in at least some embodiments, the message portion 500 includes information sufficient for a product installation to instantiate an anomaly detector and operate the anomaly detector to rank events occurring within a computer system. In some cases, the anomaly detector is an ensembled anomaly detector, which includes multiple separate anomaly detector algorithms (e.g. 430) and/or learned feature data/model data (e.g. 425). In some embodiments, an ensembled anomaly detector includes multiple anomaly detectors that share a common anomaly detection algorithm (e.g. 430), but utilize different learned features/model data (e.g. 425) to configure the anomaly detector algorithm to function differently. These two anomaly detectors may differ, in some embodiments, in the feature selection/transformation method used to process event data (e.g. 435) before the event data is provided to the anomaly detector (e.g. 430).

The message portion 500 includes a number of anomaly detectors ensembled field 504. The number of anomaly detectors ensembled field 504 specifies a number of anomaly detector algorithms used to generate a single output ranking of an ensembled anomaly detector. In some embodiments the number of anomaly detectors ensembled field 504 specifies a single anomaly detector. In this case, there is no need to combine rankings as described above with respect to FIG. 2C. Instead, the anomaly detector specified by the message portion 500 operates similar to anomaly detector 430, discussed below with respect to FIG. 4.

Several fields of the message portion 500 repeat for every anomaly detector included in an ensembled anomaly detector as specified by field 504. Those fields include an algorithm specification field 506 a model definition field 508, hyper parameters field 509, and a field storing data defining feature selection and/or feature transformation control parameters 510. The algorithm specification field 506 defines an anomaly detection algorithm (e.g. 430). As discussed above, some embodiments define an anomaly detection algorithm via instructions that implement the algorithm (e.g. intermediate or binary code implementing the algorithm). Other embodiments identify an anomaly detection algorithm via a unique identifier that identifies the algorithm via a predetermined mapping of identifiers to algorithms. Model definition field 508 stores data defining a trained model. In embodiments that communicate an anomaly detection configuration defining a trained anomaly detector, the model definition field 508 is included in the message portion 500. Some other embodiments may provide for some local training of an anomaly detector. In those embodiments, the message portion 500 includes the hyper parameters field 509. In these embodiments, a model defined by the model definition field 508 is received by a product installation (e.g. any one or more of 104a-d). The product installation then uses the hyperparameters (e.g. as stored in 509) and the algorithm specification (e.g. as stored in 506) to further train the model (e.g. as stored in 508). The product installation then detects relevant events based on the further trained model.

After all of the anomaly detectors included in an ensembled anomaly detector are specified by the message portion 500, a combiner configuration field 512 is included. As discussed above with respect to combiner configuration 246 in FIG. 2C, the combination configuration field 512 specifies how multiple rankings generated by anomaly detectors included in an ensembled anomaly detector are combined to generate a single output ranking (e.g. 246). If the message portion 500 specifies a non-ensembled anomaly detector (e.g. an anomaly detector including only one anomaly detection algorithm and one anomaly detection model), then the combiner configuration field 512 is not included in the message portion 500.

Figure 6:
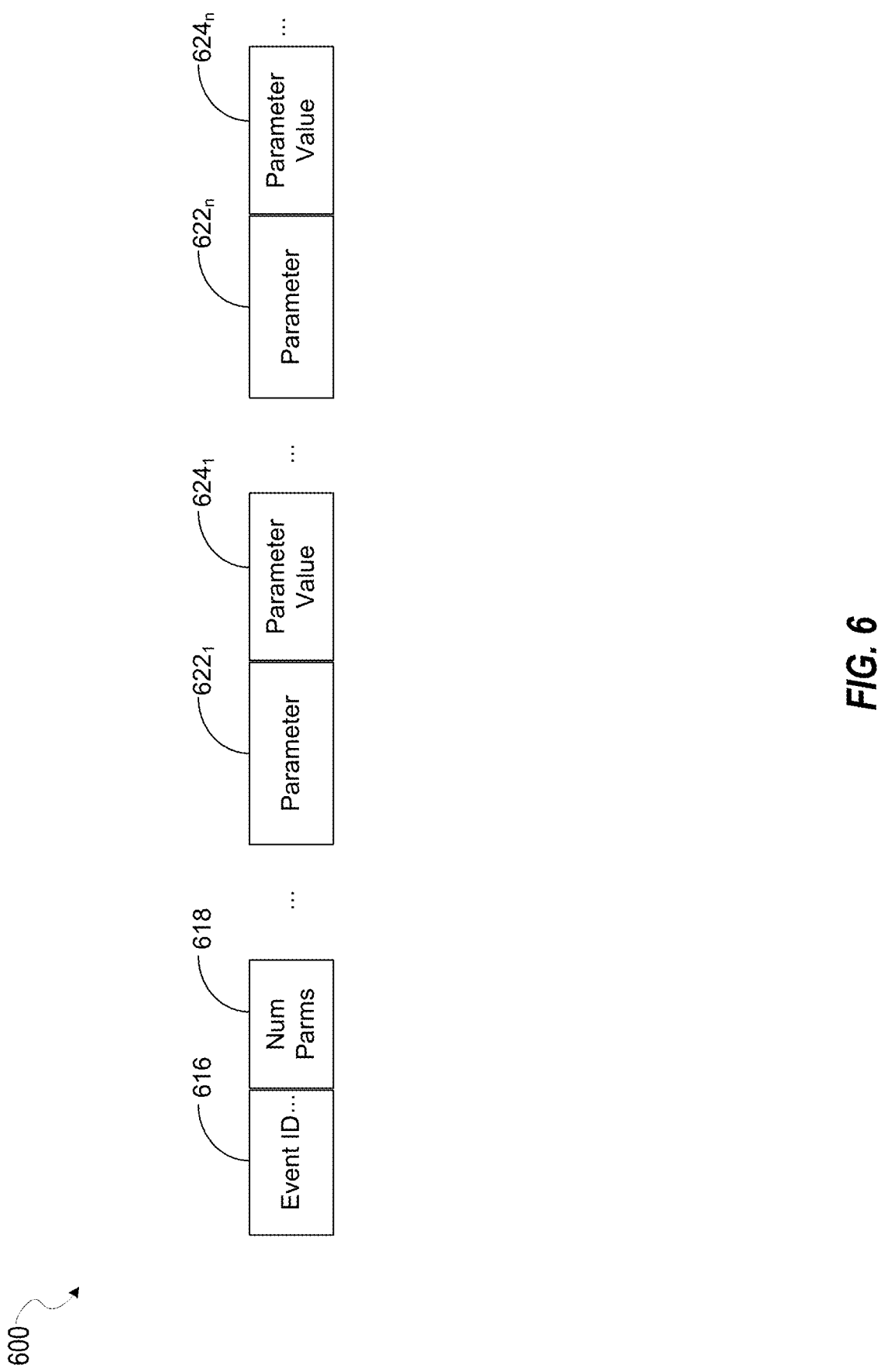
FIG. 6 shows an example message portion that may be implemented in one or more of the disclosed embodiments.

FIG. 6 shows an example message portion 600 that may be implemented in one or more of the disclosed embodiments. In some embodiments, the message portion 600 is transmitted from a product installation to the anomaly detector creation hub 102. For example, in some embodiments, one or more fields discussed below with respect to example message portion 600 are transmitted from any one or more of the product installations 104a-d to the creation hub 102 via data flows 106a-d respectively.

The example message portion 600 includes an event identifier field 616, and a number of parameters field 618. The event identifier field 616 identifies an event that was identified by a product installation. In some embodiments, the event was identified via an anomaly detector that was previously provided to the product installation by the creation hub 102. The number of parameters field 618 identifies a number of parameters specified by the message portion 600. Following the number of parameters field 618 are pairs of fields, one pair for each parameter indicated by field 618. Each pair includes a parameter field 622 and a parameter value field 624. The parameter field 622 identifies a parameter. For example, some of the disclosed embodiments maintain a mapping of system parameters to predetermined identifiers. Each system parameter may then be identified via one of the predetermined numbers and the mapping. The parameter value field 624 stores a value for the identified parameter.

The system parameters identified by the example message portion 600 may convey a variety of information regarding operation of a particular system. The system parameters include one or more of hardware operating parameters or software operating parameters. Example system parameters may include CPU utilization, memory utilization, memory available, I/O utilization, free disk space, temperature. System parameters may include parameters specific to a particular software application, such as parameter indicating a number of network connections, error counts, including error counts for different types of errors, and other parameters that convey information regarding operation of a computing system.

In some embodiments, the information described above with respect to FIG. 6 may repeat within a single message. For example, the message portion 600 may include multiple event id fields 616 describing multiple events, along with multiple number of parameter fields 618 and the corresponding and supporting fields 622 and 624.

Figure 7:
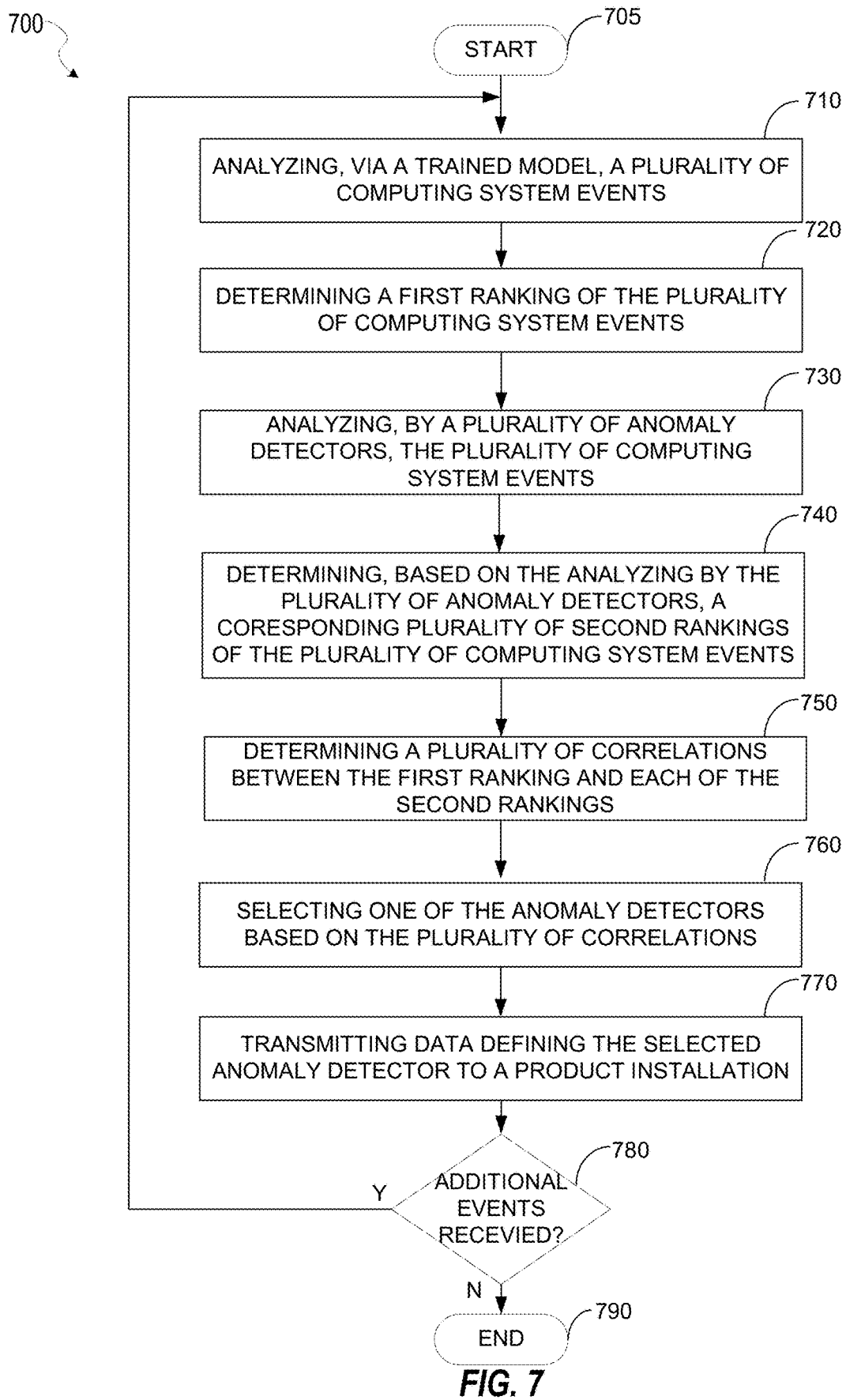
FIG. 7 is a flowchart of a process for defining an anomaly detector.

FIG. 7 is a flowchart of a process for defining an anomaly detector. In some aspects, one or more of the functions discussed below with respect to FIG. 7 may be performed by hardware processing circuitry. For example, in some embodiments, instructions stored in a memory configure the hardware processing circuitry to perform one or more of the functions and/or operations discussed below with respect to FIG. 7.

In operation 710, a plurality of computing system events are analyzed by a trained model. For example, as discussed above with respect to FIG. 2A, a trained classifier (e.g. model) 205 reads event data from the computer event data store 202. In some embodiments, operation 710 includes processing event data (e.g. from the event data store 202) via a cluster-based feature transformation. The resulting events are then provided to the trained classifier. For example, in some embodiments, the plurality of computing system events are generated by projecting a most frequently occurring set of features that vary within the event data.

In operation 720, a first ranking is determined based on the analyzing of operation 710. The trained classifier 205 ranks the computer events identified in the computer event data store 202. Each of the events is assigned a unique ranking indicating how anomalous the event is relative to other events included in the computer event data store 202. The first ranking determined in operation 720 is considered a reference ranking, with a ranking of an event within the reference ranking considered the events reference ranking, as discussed further below.

In operation 730, the plurality of computer system events are analyzed by a plurality of anomaly detectors. For example, as illustrated above with respect to FIG. 2A, the anomaly detectors 204*a-d* read computer system events from the computer event data store 202. Two of the plurality of anomaly detectors use an equivalent anomaly detection algorithm (e.g. 430 of FIG. 4) but different hyperparameter values (e.g. 420 of FIG. 4). In some embodiments, at least two of the plurality of anomaly detectors use different anomaly detection algorithms. In some embodiments one or more of the anomaly detectors may utilize a one class support vector machine (SVM) algorithm, a k-means algorithm, or a local outlier factor algorithm. Embodiments are not limited to these algorithm examples however.

In some embodiments, at least two of the plurality of anomaly detectors utilize the local outlier factor algorithm. Each of the at least two anomaly detectors use different locality (K) values. In some embodiments, at least two of the anomaly detectors utilize a one class support vector machine. The at least two anomaly detectors utilize different kernels. The kernels are selected from radial basis function (rbf), linear, polynomial, or sigmoid. In some aspects, at least two of the plurality of anomaly detectors utilize a one class support vector machine algorithm. The at least two anomaly detectors are configured with different nu values (e.g. hyperparameter values 420). In some embodiments, at least two of the plurality of anomaly detectors utilize a K-means clustering algorithm These at least two anomaly detectors are configured with different locality (K) values (e.g. hyperparameter values 420).

In operation 740, a plurality of second rankings of the computer system events is generated based on the second analyzing of operation 730. Each of the anomaly detectors ranks the computer system events. As illustrated in FIG. 2A, the individual rankings of each anomaly detector are shown as data flows 206*a-d*.

In operation 750, a plurality of correlations are determined. Each of the plurality of correlations is represented by a respective correlation score in some embodiments. Each of the correlations are between the first ranking (reference ranking) and a different one of the second rankings. For example, as illustrated above with respect to FIG. 2A, each of the correlators 210*a-d* receive an output of the trained classifier 205, which indicates the first ranking. Each of the correlators 210*a-d* also receive input from a different one of the anomaly detectors 204*a-d*. In some embodiments, the correlations are operation 750 are determined using one or more of spearman's Rho, Kendall's Tau, a combined Spearman and Kendall method, Rank Bi-serial, or average rank bi-serial. In some embodiments, the correlations are determined based only on a highest ranked portion of each of the (first and second) rankings. In other words, in some embodiments, to improve quality of the selected anomaly detector and/or reduce processing overhead, a percentage or absolute number of highest ranked events from each of the first and second rankings are correlated. For example, in some embodiments, a top one, two, five, or ten percent of each ranking are correlated. In some embodiments a top five (5), ten (10), twenty (20), or fifty (50) highest ranked events from each of the rankings are correlated. In some embodiments each of the second rankings is adjusted via outlier preserving normalization before the correlations are determined.

Some embodiments employ a Rank Bi-Serial correlation method that is modified relative to well established versions of this method. In some embodiments, a top K threshold (e.g. top 100) is defined and events ranked above this threshold are considered in a correlation calculation. A first set of event pairs is generated. Each event pair includes a first event ranked above the threshold and a second event of the pair is ranked below the threshold.

A second set of event pairs is then generated based on the first set of event pairs. The second set of event pairs is generated based on a first selection criterion applied to the first set of event pairs. The first selection criterion identifies those pairs where the first event has a higher reference ranking than the second event of the pair (having a ranking below the ranking threshold). The reference ranking is the ranking assigned to the event by the trained classifier 205.

A faction is then determined representing those pairs where the above threshold event (first event) has a higher reference score than the below threshold event (second event). Intuitively, this fraction represents how often a detector's top anomalies are more relevant than other events, as measured by the trained classifier. This fraction is then used as a correlation score when comparing anomaly detectors to determine which is selected for use by a product installation.

A correlation score for the anomaly detector is then determined according to Equation 1 below:

$$\text{ascore}_i = p_i - (1-p_i) = 2p_i - 1 \qquad (1)$$

where:
ascore$_i$ represents a correlation score for a particular (ith) anomaly detector configuration,
pi is a fraction of pairs matching the reference score criterion discussed above In operation 760, one of the anomaly detectors is selected based on the plurality of correlations. In some embodiments, the one anomaly detector having the highest correlation score (e.g. best correlation with the reference ranking) is selected in operation 760. Some aspects generate multiple correlation scores using multiple correlation methods. For example, multiple correlation methods including Spearman, and computer Kendall may be computed from the results of each anomaly detector. These multiple correlation scores are averaged or otherwise aggregated in some of these embodiments. The aggregated correlations are then compared across anomaly detectors, with the anomaly detector having the best aggregated correlation score then selected in operation 760.

In operation 770, data defining the selected anomaly detector is transmitted to a product installation. For example, as discussed above with respect to FIG. 1, the creation hub 102 transmits data to a product installation (e.g. any of 104a-d), with the data defining an anomaly detector. As discussed above with respect to FIG. 5, the data defining an anomaly detector is included in message portion 500, at least in some embodiments. The message portion includes, in various embodiments, one or more of data defining an anomaly detection algorithm (e.g. field 506 defining anomaly detection algorithm 430), hyperparameters (e.g. field 509), and data defining a model (e.g. field 508 defining model 425).

Decision operation 780 determines whether additional events have been received. If no events are received, process 700 moves from decision operation 780 to end operation 790. If events are received, process 700 moves from decision operation 780 to operation 710, which analyzes the newly received events as the "plurality of computing system events," and the processing described above with respect to FIG. 7 repeats with respect to the new events. In some aspects, decision operation 780 may wait for a period of time for new events to accumulate (e.g. an elapsed time and/or a number of new events exceeds a predetermined threshold) before returning control to operation 710.

While process 700 as described above includes the transmission of data defining an anomaly detector to a product installation. This division of functions is described with respect to at least FIG. 1, the combination of FIGS. 7 and 9. However, some of the disclosed embodiments do not necessarily include this division of functions. For example, some embodiments may perform the functions associated with, for example, operations 705-760 and 910-935. In other words, some embodiments compare a variety of anomaly detector configurations, select one of the anomaly detectors, and then also detect an event based on the selected anomaly detector.

Figure 8:
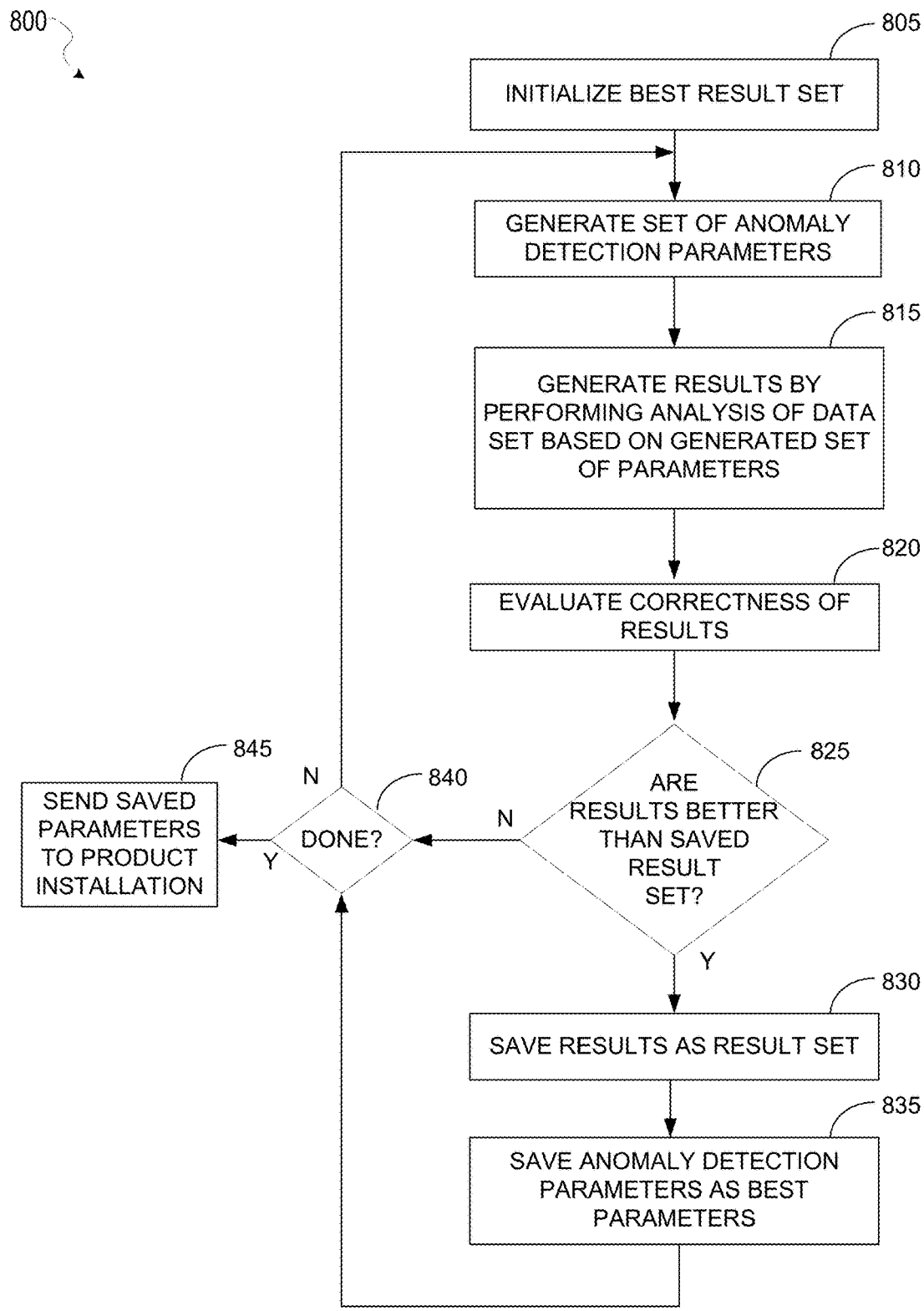
FIG. 8 is a flowchart of a process for defining an anomaly detector.

FIG. 8 is a flowchart of a process for defining an anomaly detector. In some aspects, process 800 discussed below with respect to FIG. 8 defines a single anomaly detector consisting of a single anomaly detection algorithm, learned features/model (e.g. 425), and single feature/selection transformation configuration (e.g. 440). In some aspects, process 800 defines an ensembled anomaly detector, for example, an anomaly detector having the structure described above with respect to FIG. 2C.

In some aspects, one or more of the functions discussed below with respect to FIG. 8 may be performed by hardware processing circuitry. For example, in some embodiments, instructions stored in a memory configure the hardware processing circuitry to perform one or more of the functions and/or operations discussed below with respect to FIG. 8. In some aspects, one or more of the functions discussed below with respect to FIG. 8 operate in parallel. For example, multiple anomaly detector configurations may process event data in parallel (e.g. multiple parallel execution of operations 810 and 815 discussed below) and generate results which are then compared in operation 825.

In operation 805, a result set is initialized. The result set is designed to store results reflecting an accuracy of an anomaly detection configuration. For example, the result set may include data indicating a correlation between results of an anomaly detection configuration and a reference set of results. The reference set of results may indicate a desired or acceptable result set. Initializing the result set includes setting the result set to a value indicating a very low correlation. The initialization value functions to cause a first valid set of results to replace the initial result set in the process 800 discussed further below.

In operation 810, a set of anomaly detection parameters are generated. The set of anomaly detection parameters define a configuration of an anomaly detector. For example, as discussed above with respect to FIGS. 4 and 5, an anomaly detector configuration may include a definition of an algorithm used for anomaly detection, (e.g. 430), learned feature data (e.g. 425), and a specification for a feature selection/transformation scheme (e.g. to control component 440). In embodiments of FIG. 8 that generate an ensembled anomaly detector, multiple versions of the above parameters are generated, one for each anomaly detector included in the ensembled detector. When an ensembled detector is defined by operation 810, operation 810 also defines combiner configuration data (e.g. 246) to control how output of each of the defined anomaly detectors are combined to generate a single ranking.

In some aspects, the generation of the set of parameters may include a random component. For example, FIG. 8 shows that operation 810 may be performed more than once. Each performance of operation 810 varies the generated parameters so as to alter how anomaly detection is performed in a resulting anomaly detector (e.g. in operation 815, discussed below). In some aspects, the generation of the parameters is performed according to a policy. The policy defines methods for varying the parameters. For example, some embodiments may utilize Bayesian hyperparameter optimization, and/or recommender system techniques to generate the parameters.

In operation 815, results are generated by analyzing a data set using the anomaly detector configuration defined by the generated parameters of operation 810. For example, as discussed above with respect to FIG. 2A, each of the anomaly detector configurations 204a-d read computer event data from the data store 202 and generate results (e.g. 206a-d respectively).

In operation 820, an evaluation of the results is performed. The evaluation generates an indication of correctness of the results. In some aspects, the indication of correctness indicates an amount of correlation between the results and a reference set of results.

Decision operation 825 determines whether the results are better than the saved result set. Thus, in some aspects, decision operation 825 compares a correlation of the results obtained in operation 815 with a reference set of results, to a second correlation of the results stored in the result set. If the current results reflect more correlation with the reference results than the saved results, process 800 moves to operation 830 from decision operation 825.

In operation 830, the results are saved to the result set. Thus, for example, in some embodiments, a correlation between the results generated in operation 815 and a reference set of results is stored in the result set.

In operation 835, the anomaly detection parameters that generated the results are saved.

Decision operation 840 determines if an iteration through a series of variations in anomaly detection parameters is done or complete (e.g. an iteration of FIG. 8 represents performance of operations between each execution of operation 840). Decision operation 840 may vary by embodiment. In some embodiments, decision operation 840 evaluates whether the saved results represent a threshold level of accuracy or quality. For example, if a correlation value reflected by the saved results is above a predetermined threshold value, decision operation 840 determines the iteration is complete.

In other embodiments, decision operation 840 measures an improvement in the saved results over time or per iteration of process 800. If the improvement over a predetermined period of time is below a threshold, or the improvement per iteration (over multiple iterations) is below a second predetermined improvement threshold, then operation 840 determines that enough iterations have been performed. In some other cases, decision operation determines that a threshold amount of compute power and/or elapsed time has been consumed by process 800 and that the saved results obtained up to this point are sufficient to complete process 800.

In these various cases, process 800 moves from operation 840 to operation 845, which sends or transmits the saved parameters to a product installation (e.g. any one or more of 104*a-d*). The saved parameters define an anomaly detector configuration, in that they define one or more of an anomaly detection algorithm, model data for the defined algorithm, and control parameters for a feature selection/transformation component of the anomaly detector (e.g. 442 for 440).

Figure 9:
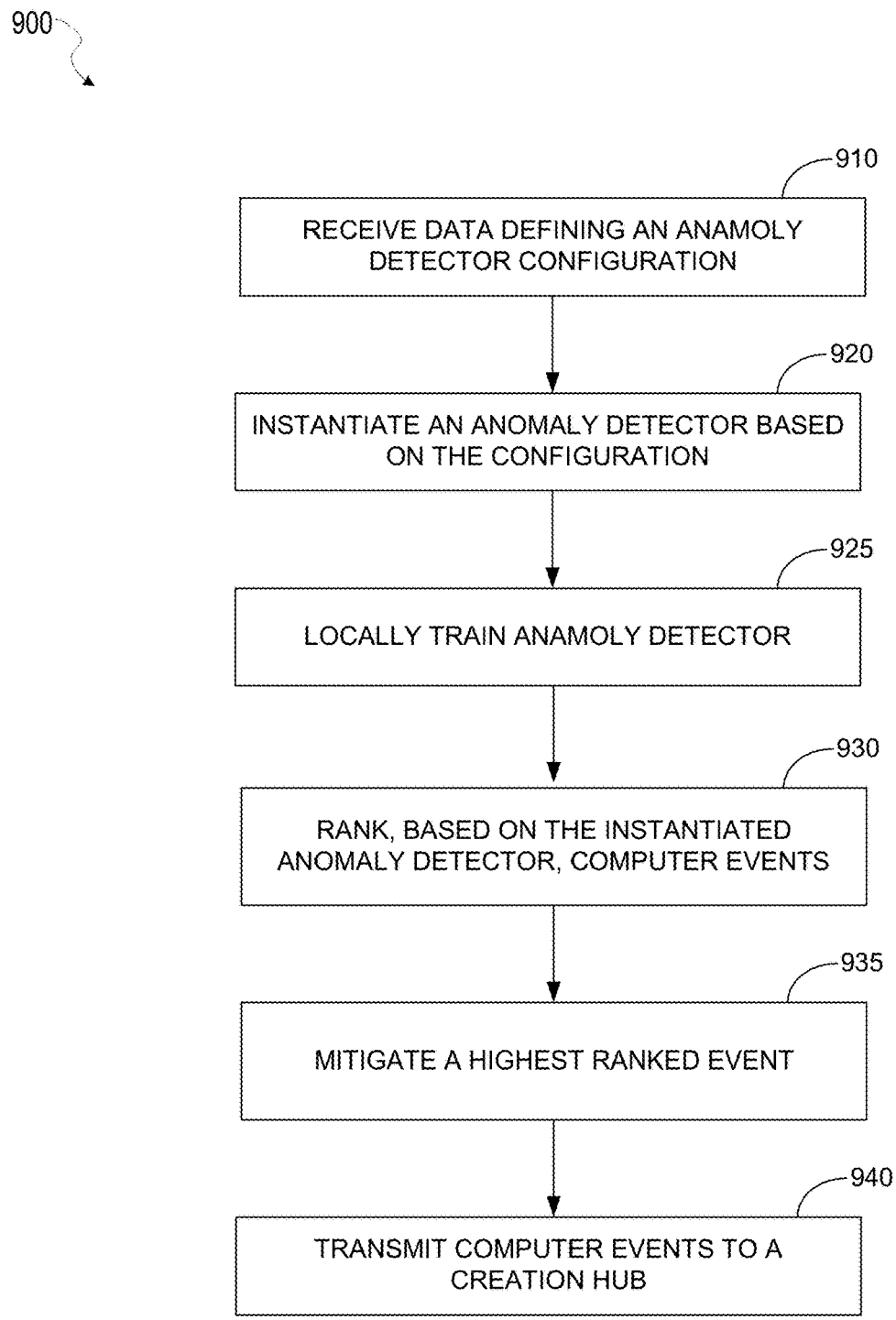
FIG. 9 is a flowchart of a process for applying an anomaly detector configuration.

FIG. 9 is a flowchart of a process for applying an anomaly detector configuration. In some aspects, one or more of the functions discussed below with respect to FIG. 9 may be performed by hardware processing circuitry. For example, in some embodiments, instructions stored in a memory configure the hardware processing circuitry to perform one or more of the functions and/or operations discussed below with respect to FIG. 9. In some embodiments, process 900 is performed by a product installation device, or a device within a local environment of a product installation (e.g. such as any of the devices 104*a-d* discussed above with respect to FIG. 1).

In operation 910, data defining an anomaly detector configuration is received. For example, as discussed above with respect to FIG. 1, any one or more of the product installations 104*a-d* receive data defining an anomaly detector via data streams 106*a-d* from the creation hub 102. The data defining an anomaly detector configuration defines one or more of an algorithm used by the anomaly detector (e.g. 430), data defining learned features or a model (e.g. 425), a definition of an anomaly detection algorithm (e.g. 430), or data defining feature selection and/or transformation control parameters (e.g. parameters 442 to configure the feature transformation component 440). In some embodiments, the received data includes instructions that implement the anomaly detection algorithm. In some other embodiments, the received data indicates a predetermined number identifying an algorithm via a mapping between predetermined numbers and algorithms. In these embodiments, a device performing operation 910 includes the instructions necessary to implement the identified algorithm.

In operation 920, an anomaly detector is instantiated based on the received configuration. For example, operation 920 executes the algorithm specified by the received anomaly detector configuration of operation 910. Operation 920 provides any model data specified by the received configuration to the executing algorithm, and provides any feature selection/transformation control parameters specified by the configuration for use in feature transformation before features are provided to the instantiated anomaly detector (e.g. via component 440, discussed above with respect to FIG. 4). Note that if the received anomaly detector configuration specifies an ensembled anomaly detector, operation 920 instantiates one or more anomaly detector algorithms, and provides to each of the instantiated anomaly detectors learned feature/model data (e.g. 425) and feature selection information (e.g. 440). When an ensembled anomaly detector is specified by the configuration, operation 920 also instantiates a combiner component (e.g. 244) and combines output of the multiple anomaly detectors based on combiner configuration (e.g. 246) specified by the anomaly detector configuration for the ensembled detector.

In operation 925, the anomaly detector is trained based on local events. For example, in some aspects, the anomaly detector configuration received in operation 910 includes hyperparameter values used for training the anomaly detector (e.g. via field 509 and 506). Process 900 then receives event information (e.g. 600) that are generated locally (e.g. within a local environment of a product installation such as any of 104*a-d*). These events are then used to train the instantiated anomaly detector. Note that not all embodiments train the instantiated anomaly detector locally. In some embodiments, hyperparameters are not specified in the anomaly detector configuration and/or not specified in the message portion 500, discussed above.

In operation 930, the instantiated anomaly detector (e.g. an ensembled anomaly detector or single anomaly detector) ranks computer events. In some embodiments, ranking computer events includes classifying the computer events. For example, a probability that each event is one of a plurality of event types is determined. For example, the anomaly detector determines, in some embodiments, whether a computer file associated with an event is malware or a known, good program. Each of these event types (malware/known good) is assigned a probability by the anomaly detector, in some embodiments.

In embodiments locally training the anomaly detector via operation 925, the ranking of events is performed by the locally trained anomaly detector. In some embodiments, the computer events may be events generated by an environment local to a product installation. For example, as discussed above with respect to FIG. 2B, the computer systems 224 and/or 226 can generate events that are analyzed by the instantiated anomaly detector running on a product installation device (e.g. 104). Some embodiments of operation 930 may generate an alert based on at least a highest ranked event. In some embodiments, one or more of the highest ranks events result in mitigation actions for the events. For example, as discussed above with respect to FIG. 3, the mitigation table 320 provides for identification of one or more mitigation actions (e.g. via field 324) associated with an event. Thus, if an event is ranked above a particular threshold, a mitigation action associated with the event is executed, at least in some embodiments.

In operation 935, a highest ranked event of the ranked events is mitigated. As discussed above with respect to FIG. 3, some embodiments define a mapping between evens and mitigation actions. Operation 935 identifies a mitigation action to perform based on the event ranked highest by operation 930. The mitigation action could include a variety of possible actions which vary by embodiments. Various embodiments perform mitigation actions such as restarting a computer generating the event, generating an alert to a particular messaging address (e.g. email or text messaging address) to alert an IT provisional of the event, deleting one or more files associated with the event, or other actions. In some embodiments, a mitigation action is identified via the mitigation table 320, discussed above with respect to FIG. 3. For example, the highest ranked event identified in operation 935 has associated with it an event identifier. The event identifier, in some embodiments, is common for events having the same type.

In operation 940, computer events are transmitted to a creation hub. The computer events are events occurring within a local environment of a product installation. For example, as discussed above with respect to FIG. 2B, the computer systems 224 and/or 226 generate events which are detected or monitored by the product installation 104. The product installation then sends data indicating these events to the creation hub 102. This is also shown in FIG. 1 as any of data flows 108*a-d*. The computer events may be sent, in at least some embodiments, via a message in substantial conformance with the message portion 600, discussed above with respect to FIG. 6. Note that in embodiments that do not separate the creation hub 102 from a product installation, the computer events identified in operation 940 are provided to a computer event data store (e.g. 202) without necessarily transmitting the computer events. For example, if a device performing process 900 has physical access to the computer event data store (e.g. 202), the device can, in some embodiments does, write the computer events directly to the computer event data store.

Figure 10:
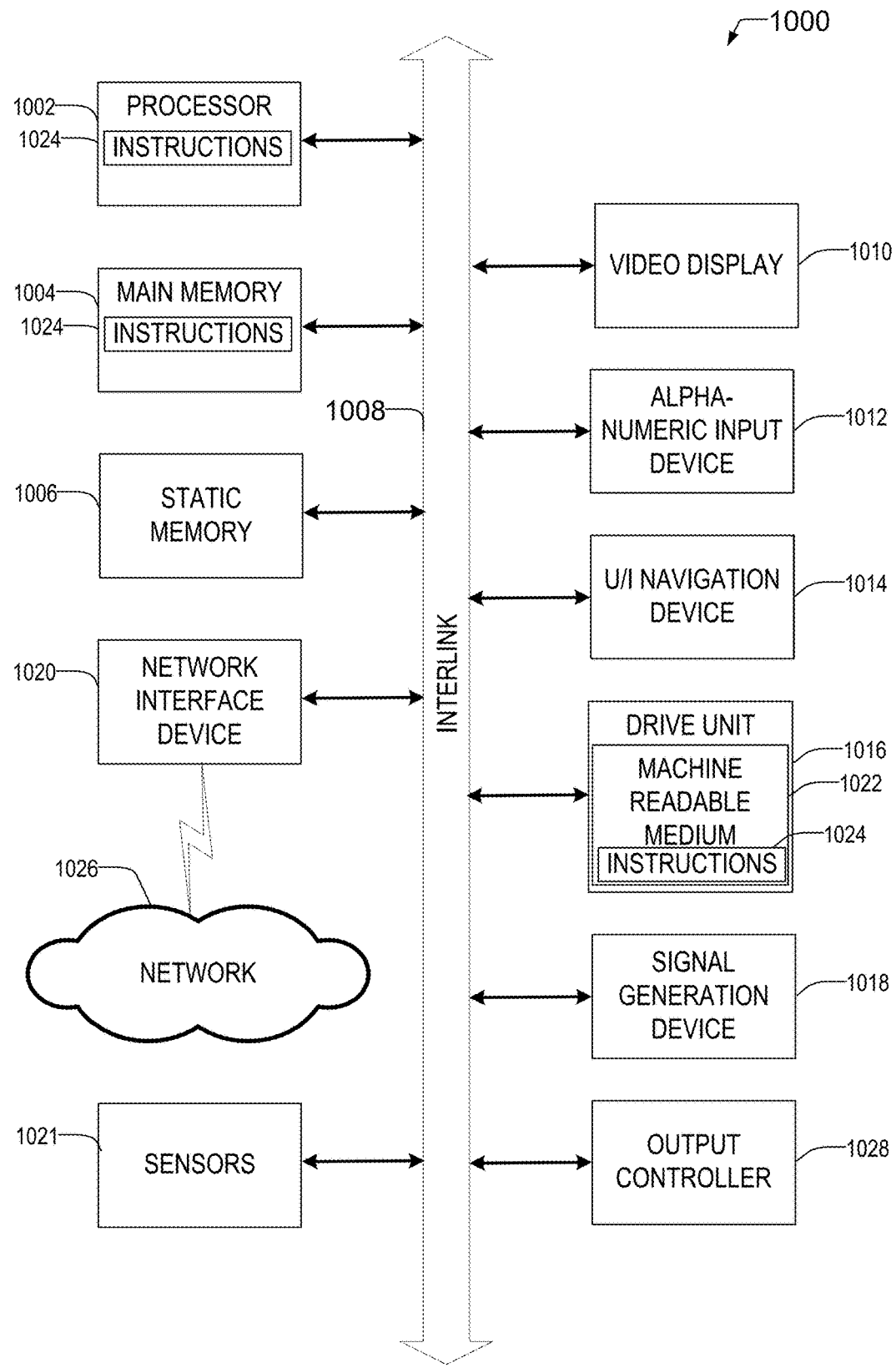
FIG. 10 illustrates a block diagram of an example machine that is implemented in one or more of the disclosed embodiments.

FIG. 10 illustrates a block diagram of an example machine 1000 upon which any one or more of the techniques (e.g., methodologies) discussed herein may perform. In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. The machine 1000 may be a personal computer (PC), a tablet PC, a set-top box (STB), a personal digital assistant (PDA), a mobile telephone, a smart phone, a web appliance, a network router, switch or bridge, a server computer, a database, conference room equipment, or any machine capable of executing instructions (sequential or otherwise) that specify actions to be taken by that machine. In various embodiments, machine 1000 may perform one or more of the processes described above with respect to FIGS. 1-9 above. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms (all referred to hereinafter as "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1000 may include a hardware processor 1002 (e.g., a central processing unit (CPU), a graphics processing unit (GPU), a hardware processor core, or any combination thereof), a main memory 1004 and a static memory 1006, some or all of which may communicate with each other via an interlink (e.g., bus) 1008. The machine 1000 may further include a display unit 1010, an alphanumeric input device 1012 (e.g., a keyboard), and a user interface (UI) navigation device 1014 (e.g., a mouse). In an example, the display unit 1010, input device 1012 and UI navigation device 1014 may be a touch screen display. The machine 1000 may additionally include a storage device (e.g., drive unit) 1016, a signal generation device 1018 (e.g., a speaker), a network interface device 1020, and one or more sensors 1021, such as a global positioning system (GPS) sensor, compass, accelerometer, or other sensor. The machine 1000 may include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1016 may include a machine readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within static memory 1006, or within the hardware processor 1002 during execution thereof by the machine 1000. In an example, one or any combination of the hardware processor 1002, the main memory 1004, the static memory 1006, or the storage device 1016 may constitute machine readable media.

While the machine readable medium 1022 is illustrated as a single medium, the term "machine readable medium" may include a single medium or multiple media (e.g., a centralized or distributed database, and/or associated caches and servers) configured to store the one or more instructions 1024.

The term "machine readable medium" may include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 1024 may further be transmitted or received over a communications network 1026 using a transmission medium via the network interface device 1020. The machine 1000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. In some examples, the network interface device 1020 may wirelessly communicate using Multiple User MIMO techniques.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Example 1 is a system, comprising: hardware processing circuitry; one or more hardware memories storing instructions that when executed configure the hardware processing circuitry to perform operations comprising: analyzing, via a trained model, a plurality of computing system events; determining, based on the analyzing, a first ranking of the plurality of computing system events; analyzing, by each of a plurality of anomaly detectors, the plurality of computing system events; determining, based on the analyzing by each of the plurality of anomaly detectors, a corresponding plurality of second rankings of the plurality of computing system events; determining a plurality of correlations, each of the correlations between the first ranking and a respective one of the second rankings; selecting one of the plurality of anomaly detectors based on the plurality of correlations; and transmitting data defining the selected one of the plurality of anomaly detectors to a product installation.

In Example 2, the subject matter of Example 1 optionally includes wherein at least two of the plurality of anomaly detectors utilize an equivalent anomaly detection algorithm with a different value for a hyperparameter.

In Example 3, the subject matter of any one or more of Examples 1-2 optionally include wherein at least two of the plurality of anomaly detectors utilize a different anomaly detection algorithm.

In Example 4, the subject matter of any one or more of Examples 1-3 optionally include wherein the determining of the plurality of correlations determines the correlations using spearman's Rho, Kendall's Tau, combined Spearman and Kendall, Rank Bi-serial, average rank bi-serial.

In Example 5, the subject matter of any one or more of Examples 1-4 optionally include wherein the plurality of anomaly detectors comprise one or more of a one class support vector machine (SVM) algorithm, k-means clustering algorithm, or local outlier factor algorithm.

In Example 6, the subject matter of Example 5 optionally includes wherein at least two of the plurality of anomaly detectors utilize a local outlier factor algorithm with different locality (K) values.

In Example 7, the subject matter of any one or more of Examples 5-6 optionally include wherein at least two of the plurality of anomaly detectors utilize one class SVM with different kernels selected from (radial basis function (rbf), linear, polynomial, or sigmoid).

In Example 8, the subject matter of any one or more of Examples 5-7 optionally include wherein at least two of the plurality of anomaly detectors utilize one class SVM with different nu values.

In Example 9, the subject matter of any one or more of Examples 5-8 optionally include wherein at least two of the plurality of anomaly detectors utilize K-means clustering with different locality (K) values.

In Example 10, the subject matter of any one or more of Examples 1-9 optionally include wherein the correlations are determined based on a highest ranked portion of each of the rankings.

In Example 11, the subject matter of any one or more of Examples 1-10 optionally include the operations further comprising adjusting, via outlier-preserving normalization, the second rankings.

In Example 12, the subject matter of any one or more of Examples 1-11 optionally include the operations further comprising generating the plurality of computing system events via a cluster-based feature transformation of an intermediate plurality of computer system events.

In Example 13, the subject matter of Example 12 optionally includes the operations further comprising generating the plurality of computing system events by projecting to a most frequent set of features that vary within the intermediate plurality of computer system events.

In Example 14, the subject matter of any one or more of Examples 1-13 optionally include the operations further comprising: receiving a second plurality of computer system events from the product installation; second analyzing, by each of a second plurality of anomaly detectors, the second plurality of computer system events; determining, based on the second analyzing by each of the second plurality of anomaly detectors, a corresponding plurality of third rankings of the second plurality of computing system events; selecting, based on the third rankings, one of the second plurality of anomaly detectors; and transmitting data defining the selected one of the second plurality of anomaly detectors to the product installation.

In Example 15, the subject matter of any one or more of Examples 1-14 optionally include second hardware processing circuitry configured to perform second operations further comprising: ranking, based on the selected anomaly detector, a second plurality of computer system events; identifying, based on the ranking, a mitigation action associated with a highest ranked event of the second plurality of computer system events; and performing the mitigation action.

Example 16 is a machine implemented method, comprising: analyzing, via a trained model, a plurality of computing system events; determining, based on the analyzing, a first ranking of the plurality of computing system events; analyzing, by a plurality of anomaly detectors, the plurality of computing system events; determining, based on the analyzing by the plurality of anomaly detectors, a corresponding plurality of second rankings of the plurality of computing system events; determining a plurality of correlations, each of the correlations between the first ranking and a respective one of the second rankings; selecting one of the plurality of anomaly detectors based on the plurality of correlations; ranking, based on the selected anomaly detector, a second plurality of computer system events; identifying, based on the ranking, a mitigation action associated with a highest ranked event of the second plurality of computer system events; and performing the mitigation action.

In Example 17, the subject matter of Example 16 optionally includes wherein at least two of the plurality of anomaly detectors utilize an equivalent anomaly detection algorithm with differing hyperparameter values.

In Example 18, the subject matter of any one or more of Examples 16-17 optionally include wherein at least two of the plurality of anomaly detectors utilize a different anomaly detection algorithm.

In Example 19, the subject matter of any one or more of Examples 16-18 optionally include wherein the determining of the plurality of correlations determines the correlations using spearman's Rho, Kendall's Tau, combined Spearman and Kendall, Rank Bi-serial, average rank bi-serial.

Example 20 is a non-transitory computer readable storage medium comprising instructions that when executed configure hardware processing circuitry to perform operations comprising: analyzing, via a trained model, a plurality of computing system events; determining, based on the analyzing, a first ranking of the plurality of computing system events; analyzing, by a plurality of anomaly detectors, the plurality of computing system events; determining, based on the analyzing by the plurality of anomaly detectors, a corresponding plurality of second rankings of the plurality of computing system events; determining a plurality of correlations, each of the correlations between the first ranking and a respective one of the second rankings; selecting one of the plurality of anomaly detectors based on the plurality of correlations; and transmitting data defining the selected one of the plurality of anomaly detectors to a product installation.

In Example 21, the subject matter of Example 20 optionally includes wherein at least two of the plurality of anomaly detectors utilize an equivalent anomaly detection algorithm with a different value for a hyperparameter.

In Example 22, the subject matter of any one or more of Examples 20-21 optionally include wherein at least two of the plurality of anomaly detectors utilize a different anomaly detection algorithm.

In Example 23, the subject matter of any one or more of Examples 20-22 optionally include wherein the determining of the plurality of correlations determines the correlations using spearman's Rho, Kendall's Tau, combined Spearman and Kendall, Rank Bi-serial, average rank bi-serial.

In Example 24, the subject matter of any one or more of Examples 20-23 optionally include wherein the plurality of anomaly detectors comprise one or more of a one class support vector machine (SVM) algorithm, k-means clustering algorithm, or local outlier factor algorithm.

In Example 25, the subject matter of Example 24 optionally includes wherein at least two of the plurality of anomaly detectors utilize a local outlier factor algorithm with different locality (K) values.

In Example 26, the subject matter of any one or more of Examples 24-25 optionally include wherein at least two of the plurality of anomaly detectors utilize one class SVM with different kernels selected from (radial basis function (rbf), linear, polynomial, or sigmoid).

In Example 27, the subject matter of any one or more of Examples 24-26 optionally include wherein at least two of the plurality of anomaly detectors utilize one class SVM with different nu values.

In Example 28, the subject matter of any one or more of Examples 24-27 optionally include wherein at least two of the plurality of anomaly detectors utilize K-means clustering with different locality (K) values.

In Example 29, the subject matter of any one or more of Examples 20-28 optionally include wherein the correlations are determined based on a highest ranked portion of each of the rankings.

In Example 30, the subject matter of any one or more of Examples 20-29 optionally include the operations further comprising adjusting, via outlier-preserving normalization, the second rankings.

In Example 31, the subject matter of any one or more of Examples 20-30 optionally include the operations further comprising generating the plurality of computing system events via a cluster-based feature transformation of an intermediate plurality of computer system events.

In Example 32, the subject matter of Example 31 optionally includes the operations further comprising generating the plurality of computing system events by projecting to a most frequent set of features that vary within the intermediate plurality of computer system events.

In Example 33, the subject matter of any one or more of Examples 20-32 optionally include the operations further comprising: receiving a second plurality of computer system events from the product installation; second analyzing, by each of a second plurality of anomaly detectors, the second plurality of computer system events; determining, based on the second analyzing by each of the second plurality of anomaly detectors, a corresponding plurality of third rankings of the second plurality of computing system events; selecting, based on the third rankings, one of the second plurality of anomaly detectors; and transmitting data defining the selected one of the second plurality of anomaly detectors to the product installation.

In Example 34, the subject matter of any one or more of Examples 20-33 optionally include the operations further comprising: ranking, based on the selected anomaly detector, a second plurality of computer system events; identifying, based on the ranking, a mitigation action associated with a highest ranked event of the second plurality of computer system events; and performing the mitigation action.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory; etc.

We claim:

1. A system, comprising:
   hardware processing circuitry; and
   one or more hardware memories storing instructions that when executed configure the hardware processing circuitry to perform operations comprising:
   analyzing, via a trained model, a plurality of computing system events;
   determining, based on the analyzing, a first ranking of the plurality of computing system events;
   analyzing, by each of a plurality of anomaly detectors, the plurality of computing system events;
   determining, based on the analyzing by each of the plurality of anomaly detectors, a corresponding plurality of second rankings of the plurality of computing system events;
   determining a plurality of correlations, each of the correlations between the first ranking and a respective one of the second rankings;
   selecting one of the plurality of anomaly detectors based on the plurality of correlations;
   identifying, based on the selected anomaly detector, an anomaly mitigation action associated with a second computer system event; and
   causing performance of the identified anomaly mitigation action, the anomaly mitigation action including one or more of restarting a computer, deleting a file, or increasing swap space available.

2. The system of claim 1, wherein at least two of the plurality of anomaly detectors utilize an equivalent anomaly detection algorithm with a different value for a hyperparameter.

3. The system of claim 1, wherein at least two of the plurality of anomaly detectors utilize a different anomaly detection algorithm.

4. The system of claim 1, wherein the determining of the plurality of correlations determines the correlations using Spearman's Rho, Kendall's Tau, combined Spearman and Kendall, rank bi-serial, or average rank bi-serial.

5. The system of claim 1, wherein the plurality of anomaly detectors comprise one or more of a one class support vector machine (SVM) algorithm, k-means clustering algorithm, or local outlier factor algorithm.

6. The system of claim 5, wherein at least two of the plurality of anomaly detectors utilize a local outlier factor algorithm with different locality (K) values.

7. The system of claim 5, wherein at least two of the plurality of anomaly detectors utilize one class SVM with different kernels selected from radial basis function (RBF), linear, polynomial, or sigmoid.

8. The system of claim 5, wherein at least two of the plurality of anomaly detectors utilize one class SVM with different nu values.

9. The system of claim 5, wherein at least two of the plurality of anomaly detectors utilize K-means clustering with different locality (K) values.

10. The system of claim 1, wherein the correlations are determined based on a highest ranked portion of each of the first and second rankings.

11. The system of claim 1, the operations further comprising adjusting, via outlier-preserving normalization, the second rankings.

12. The system of claim 1, the operations further comprising generating the plurality of computing system events via a cluster-based feature transformation of an intermediate plurality of computer system events.

13. The system of claim 12, the operations further comprising generating the plurality of computing system events by projecting to a most frequent set of features that vary within the intermediate plurality of computer system events.

14. The system of claim 1, the operations further comprising:
   receiving a second plurality of computer system events from the product installation;
   second analyzing, by each of a second plurality of anomaly detectors, the second plurality of computer system events;
   determining, based on the second analyzing by each of the second plurality of anomaly detectors, a corresponding plurality of third rankings of the second plurality of computing system events;
   selecting, based on the third rankings, one of the second plurality of anomaly detectors; and
   transmitting data defining the selected one of the second plurality of anomaly detectors to the product installation.

15. The system of claim 1, further comprising:
   second hardware processing circuitry configured to perform second operations comprising:
   ranking, based on the selected anomaly detector, a second plurality of computer system events;

identifying, based on the ranking, a mitigation action associated with a highest ranked event of the second plurality of computer system events; and performing the mitigation action.

16. A machine implemented method, comprising:

analyzing, via a trained model, a plurality of computing system events;

determining, based on the analyzing, a first ranking of the plurality of computing system events;

analyzing, by a plurality of anomaly detectors, the plurality of computing system events;

determining, based on the analyzing by the plurality of anomaly detectors, a corresponding plurality of second rankings of the plurality of computing system events;

determining a plurality of correlations, each of the correlations between the first ranking and a respective one of the second rankings;

selecting one of the plurality of anomaly detectors based on the plurality of correlations;

ranking, based on the selected anomaly detector, a second plurality of computer system events;

identifying, based on the ranking, an anomaly mitigation action associated with a highest ranked event of the second plurality of computer system events; and causing performance of the identified anomaly mitigation action, the anomaly mitigation action including one or more of restarting a computer, deleting a file, or increasing available swap space.

17. The method of claim 16, wherein at least two of the plurality of anomaly detectors utilize an equivalent anomaly detection algorithm with differing hyperparameter values.

18. The method of claim 16, wherein at least two of the plurality of anomaly detectors utilize a different anomaly detection algorithm.

19. The method of claim 16, wherein the determining of the plurality of correlations determines the correlations using Spearman's Rho, Kendall's Tau, combined Spearman and Kendall, rank bi-serial, or average rank bi-serial.

20. A non-transitory computer readable storage medium comprising instructions that when executed configure hardware processing circuitry to perform operations comprising:

analyzing, via a trained model, a plurality of computing system events;

determining, based on the analyzing, a first ranking of the plurality of computing system events;

analyzing, by a plurality of anomaly detectors, the plurality of computing system events;

determining, based on the analyzing by the plurality of anomaly detectors, a corresponding plurality of second rankings of the plurality of computing system events;

determining a plurality of correlations, each of the correlations between the first ranking and a respective one of the second rankings;

selecting one of the plurality of anomaly detectors based on the plurality of correlations;

ranking, based on the selected anomaly detector, a second plurality of computer system events:

identifying, based on the ranking, an anomaly mitigation action associated with a highest ranked event of the second plurality of computer system events; and causing performance of the identified anomaly mitigation action, the anomaly mitigation action including one or more of restarting a computer, deleting a file, or increasing swap space available.

* * * * *